United States Patent
Bae et al.

(10) Patent No.: US 11,983,501 B2
(45) Date of Patent: May 14, 2024

(54) APPARATUS AND METHOD FOR AUTOMATIC GENERATION OF MACHINE READING COMPREHENSION TRAINING DATA

(71) Applicant: Electronics and Telecommunications Research Institute, Daejeon (KR)

(72) Inventors: Yong Jin Bae, Daejeon (KR); Joon Ho Lim, Daejeon (KR); Min Ho Kim, Daejeon (KR); Hyun Kim, Daejeon (KR); Hyun Ki Kim, Daejeon (KR); Ji Hee Ryu, Daejeon (KR); Kyung Man Bae, Daejeon (KR); Hyung Jik Lee, Daejeon (KR); Soo Jong Lim, Daejeon (KR); Myung Gil Jang, Daejeon (KR); Mi Ran Choi, Daejeon (KR); Jeong Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 308 days.

(21) Appl. No.: 17/496,272

(22) Filed: Oct. 7, 2021

(65) Prior Publication Data

US 2022/0108076 A1      Apr. 7, 2022

(30) Foreign Application Priority Data

Oct. 7, 2020   (KR) .................. 10-2020-0129497

(51) Int. Cl.
*G06F 40/30*      (2020.01)
*G06F 18/214*     (2023.01)
(Continued)

(52) U.S. Cl.
CPC ............ *G06F 40/30* (2020.01); *G06F 18/214* (2023.01); *G06F 40/49* (2020.01); *G06V 30/416* (2022.01)

(58) Field of Classification Search
CPC ........ G06F 40/30; G06F 18/214; G06F 40/49; G06F 40/56; G06F 40/211; G06F 40/268;
(Continued)

(56) References Cited

U.S. PATENT DOCUMENTS 6,356,864 B1 *   3/2002   Foltz ...................... G06F 40/30
                                                               704/9
8,355,904 B2     1/2013   Lee
(Continued)

FOREIGN PATENT DOCUMENTS

KR    10-2005-0043280    5/2005
KR    10-2016-0060253    5/2016
(Continued)

OTHER PUBLICATIONS

Cui, Y., Liu, T., Chen, Z., Ma, W., Wang, S., & Hu, G. (2017). Dataset for the first evaluation on Chinese machine reading comprehension. arXiv preprint arXiv:1709.08299. (Year: 2017).*
(Continued)

*Primary Examiner* — Michelle M Koeth
*Assistant Examiner* — Philip H Lam
(74) *Attorney, Agent, or Firm* — KILE PARK REED & HOUTTEMAN PLLC (57) ABSTRACT

The present invention relates to an apparatus and method for automatically generating machine reading comprehension training data, and more particularly, to an apparatus and method for automatically generating and managing machine reading comprehension training data based on text semantic analysis. The apparatus for automatically generating machine reading comprehension training data according to
(Continued)

the present invention includes a domain selection text collection unit configured to collect pieces of text data according to domains and subjects, a paragraph selection unit configured to select a paragraph using the pieces of collected text data and determine whether questions and correct answers are generatable, and a question and correct answer generation unit configured to generate questions and correct answers from the selected paragraph.

14 Claims, 10 Drawing Sheets

(51) Int. Cl.
*G06F 40/49* (2020.01)
*G06V 30/416* (2022.01)
(58) Field of Classification Search
CPC .... G06F 40/289; G06V 30/416; G06N 5/022; G06N 3/08
See application file for complete search history.

(56) References Cited

U.S. PATENT DOCUMENTS

| | | | | |
|---|---|---|---|---|
| 10,621,371 | B1* | 4/2020 | Schick | G06F 40/166 |
| 2009/0287678 | A1* | 11/2009 | Brown | G06F 16/3344 |
| | | | | 707/999.005 |
| 2013/0179169 | A1* | 7/2013 | Sung | G06F 40/237 |
| | | | | 704/E15.005 |
| 2015/0161106 | A1* | 6/2015 | Barbetta | G06F 40/30 |
| | | | | 434/362 |
| 2017/0371955 | A1* | 12/2017 | Allen | G06F 16/3329 |
| 2019/0019500 | A1 | 1/2019 | Jang et al. | |
| 2019/0228099 | A1* | 7/2019 | Bajaj | G06N 3/044 |
| 2019/0266573 | A1* | 8/2019 | Radhakrishnan | G06F 16/383 |
| 2019/0354848 | A1* | 11/2019 | Kotri | G06F 8/38 |
| 2019/0378513 | A1* | 12/2019 | Carnevale | G10L 15/05 |
| 2021/0124801 | A1* | 4/2021 | Thomas | G06N 5/041 |
| 2021/0142004 | A1* | 5/2021 | Li | G06F 40/253 |
| 2021/0149994 | A1* | 5/2021 | Kim | G06N 3/042 |

FOREIGN PATENT DOCUMENTS

| | | |
|---|---|---|
| KR | 10-2019-0056184 | 5/2019 |
| KR | 2019-0059084 | 5/2019 |
| KR | 10-2019-0133931 | 12/2019 |
| KR | 10-2019-0140537 | 12/2019 |
| KR | 10-2154425 | 9/2020 |
| KR | 10-2225822 | 3/2021 |

OTHER PUBLICATIONS

Ishida, R., Torisawa, K., Oh, J. H., Iida, R., Kruengkrai, C., & Kloetzer, J. (Apr. 2018). Semi-distantly supervised neural model for generating compact answers to open-domain why questions. In Proceedings of the AAAI Conference on Artificial Intelligence (vol. 32, No. 1).) (Year: 2018).*

Pan, S., & McKeown, K. (1999). Word informativeness and automatic pitch accent modeling. (Year: 1999).*

Clapp, W., & Anttila, A. (2020). To Predict or to Memorize: Prominence in Inaugural Addresses. In Proceedings of the Annual Meetings on Phonology. (Year: 2020).*

Bell, A., Brenier, J. M., Gregory, M., Girand, C., & Jurafsky, D. (2009). Predictability effects on durations of content and function words in conversational English. Journal of Memory and Language, 60(1), 92-111. (Year: 2009).*

Kong, J., Zhong, Z., Cai, Y., Wu, X., & Ren, D. (Nov. 2020). Tsdg: Content-aware neural response generation with two-stage decoding process. In Findings of the Association for Computational Linguistics: EMNLP 2020 (pp. 2121-2126). (Year: 2020).*

Dewang, R. K., Singh, P., & Singh, A. K. (Mar. 2016). Finding of Review Spam through "Corleone, Review Genre, Writing Style and Review Text Detail Features". In Proceedings of the second international conference on information and communication technology for competitive strategies (pp. 1-6). (Year: 2016).*

Kalinauskaitė, D. (2017). Detecting information-dense texts: Towards an automated analysis. Journal of Applied Linguistics, 1(5), 95-99. (Year: 2017).*

* cited by examiner

FIG. 2A

CHOI SOOK-HYEON'S COLLEAGUES' REVELATIONS
"THE NUMBER ONE PUNISHMENT IS CAPTAIN JANG YOON-JEONG"

ARTICLE INPUT 2020. 07. 06. AM 10:40
LAST MODIFIED 2020. 07. 06. PM 1:27     LISTEN TO TEXT, SETTING

😊2,889   👁 719        ┌──────Beta─┐
                        │ SUMMARY-BOT │  가  📄  📤
                        └─────────────┘

FELLOW ATHLETES WHO HAD BEEN PLAYING AT GYEONGJU CITY
HALL WITH THE LATE CHOI SOOK-HYEON (22), A TRIATHLETE WHO
MADE AN EXTREME CHOICE ON THE 26TH OF LAST MONTH, SAID
"CHOI AND ALL OF THE VICTIMS, INCLUDING US, CHOOSE THE
CAPTAIN AS THE FIRST PRIORITY OF PUNISHMENT."

HERE, THE CAPTAIN REFERS TO THE FORMER CAPTAIN OF
GYEONGJU CITY HALL, JANG YOON-JEONG (32). JANG IS A
REPRESENTATIVE OF THE KOREAN TRIATHLON. SHE WON THE
BRONZE MEDAL AT THE 2010 ASIAN GAMES IN GUANGZHOU AND
THE SILVER MEDAL AT THE 2018 ASIAN GAMES
IN JAKARTA-PALEMBAL.

AT A PRESS CONFERENCE HELD AT THE NATIONAL ASSEMBLY
COMMUNICATION HALL ON THE 6TH, REP. LEE YONG OF THE
UNITED FUTURE PARTY REVEALED THEIR REAL NAMES AS
"DIRECTOR KIM GYU-BONG AND PLAYER JANG YOON-JEONG" AND
URGED THE PUNISHMENT OF THOSE WHO WERE IDENTIFIED
AS PERPETRATORS.

FIG. 2B

| NEPTUNE |
|---|

FROM WIKIPEDIA, THE FREE ENCYCLOPEDIA

A NOVEL ADAPTATION OF THE COUNT OF <MONTE CRISTO> IS ALSO TITLED <NEPTUNE>

NEPTUNE IS THE EIGHTH AND FARTHEST KNOWN SOLAR PLANET FROM THE SUN. IN THE SOLAR SYSTEM, IT IS THE FOURTH-LARGEST PLANET BY DIAMETER, THE THIRD-MOST-MASSIVE PLANET, AND THE DENSEST GIANT PLANET. IT IS 17 TIMES THE MASS OF EARTH, SLIGHTLY MORE MASSIVE THAN ITS NEAR-TWIN URANUS. NEPTUNE IS DENSER AND PHYSICALLY SMALLER THAN URANUS BECAUSE ITS GREATER MASS CAUSES MORE GRAVITATIONAL COMPRESSION OF ITS ATMOSPHERE. THE PLANET ORBITS THE SUN ONCE EVERY 164.8 YEARS AT AN AVERAGE DISTANCE OF 30.1 AU (4.5 BILLION KM; 2.8 BILLION MI). IT IS NAMED AFTER THE ROMAN GOD OF THE SEA AND HAS THE ASTRONOMICAL SYMBOL Ψ, A STYLISED VERSION OF THE GOD NEPTUNE'S TRIDENT OR THE GREEK LETTER PSI.

NEPTUNE IS NOT VISIBLE TO THE UNAIDED EYE AND IS THE ONLY PLANET IN THE SOLAR SYSTEM FOUND BY MATHEMATICAL PREDICTION RATHER THAN BY EMPIRICAL OBSERVATION. UNEXPECTED CHANGES IN THE ORBIT OF URANUS LED ALEXIS BOUVARD TO DEDUCE THAT ITS ORBIT WAS SUBJECT TO GRAVITATIONAL PERTURBATION BY AN UNKNOWN PLANET. AFTER BOUVARD'S DEATH, THE POSITION OF NEPTUNE WAS PREDICTED FROM HIS OBSERVATIONS, INDEPENDENTLY, BY JOHN COUCH ADAMS AND URBAIN LE VERRIER. NEPTUNE WAS SUBSEQUENTLY OBSERVED WITH A TELESCOPE ON 23 SEPTEMBER 1846[1] BY JOHANN GALLE WITHIN A DEGREE OF THE POSITION PREDICTED DISCOVERED SHORTLY THEREAFTER, THOUGH NONE OF THE PLANET'S REMAINING 13 KNOWN MOONS WERE LOCATED TELESCOPICALLY UNTIL THE 20TH CENTURY. THE PLANET'S DISTANCE FROM EARTH GIVES IT A VERY SMALL APPARENT SIZE, MAKING IT CHALLENGING TO STUDY WITH EARTH-BASED TELESCOPES. NEPTUNE WAS VISITED BY VOYAGER 2, WHEN IT FLEW BY THE PLANET ON 25 AUGUST 1989; VOYAGER 2 REMAINS THE ONLY SPACECRAFT TO VISIT NEPTUNE.[17][18] THE ADVENT OF THE HUBBLE SPACE TELESCOPE AND LARGE GROUND-BASED TELESCOPES WITH ADAPTIVE OPTICS HAS RECENTLY ALLOWED FOR ADDITIONAL DETAILED OBSERVATIONS FROM AFAR.

| SEMANTIC ROLE RECOGNITION RESULT ||
|---|---|
| PRED (PREDICATE) | ORGANIZED |
| AGENT (ACTIVATOR) | NEW PEOPLE'S ASSOCIATION |
| TMP (TIME) | 1907 |

FIG. 5

| SEMANTIC ROLE LABEL | DEFINITION |
|---|---|
| ARG0 | activator of predicate, actor(agent) |
| ARG1 | passive of predicate(patient) |
| ARG2 | starting point, benefactive, attribute |
| ARG3 | ending point |
| M-LOC | locatives |
| M-DIR | directional |
| M-CND | condition |
| M-MNR | manner |
| M-TMP | temporal |
| M-EXT | extent |
| M-PRD | secondary predication |
| M-PRP | purpose clauses |
| M-CAU | cause clauses |
| M-DIS | discourse |
| M-ADV | adverbials |
| M-NEG | negation |
| M-INS | instrument |

FIG. 6

| QUESTION TYPE | TEXT (INCLUDING SRL LABEL) | QUESTION | CORRECT ANSWER |
|---|---|---|---|
| WHO | KING JINHEUNG (ARG0) REORGANIZED HWARANG | WHO REORGANIZED HWARANG? | KING JINHEUNG |
| WHEN | RHODODENDRONS BLOOM IN EARLY SPRING (M-TMP) | WHEN DO RHODODENDRONS BLOOM? | IN SPRING |
| WHERE | SAMSUNG ELECTRONICS HEADQUARTERS IS LOCATED IN SUWON (M-LOC) | WHERE IS SAMSUNG ELECTRONICS HEADQUARTERS LOCATED? | SUWON |
| HOW | PEASANTS PROMOTED REFORMS BY SETTING UP "JIPGANGSO" (COLLECTING STATION) (M-MNR) | HOW DID PEASANTS PROMOTE REFORMS? | BY SETTING UP "JIPGANGSO" (COLLECTING STATION) |
| WHY | ROADSIDE TREES FELL DUE TO LAST NIGHT'S STRONG WINDS (M-CAU) | WHY DID ROADSIDE TREES FALL LAST NIGHT? | DUE TO STRONG WINDS |
| WHAT | CHEOL-YI COLORED WITH COLORED PENCILS (M-INS) | WHAT DID CHEOL YI COLOR WITH? | WITH COLORED PENCILS |

APPARATUS AND METHOD FOR AUTOMATIC GENERATION OF MACHINE READING COMPREHENSION TRAINING DATA

CROSS-REFERENCE TO RELATED APPLICATION

This application claims priority to and the benefit of Korean Patent Application No. 10-2020-0129497, filed on Oct. 7, 2020, the disclosure of which is incorporated herein by reference in its entirety.

BACKGROUND

1. Field of the Invention

The present invention relates to an apparatus and method for automatically generating machine reading comprehension training data, and more particularly, to an apparatus and method for automatically generating and managing machine reading comprehension training data based on text semantic analysis.

2. Discussion of Related Art

The amount of training data directly affects the performance of models generated by deep learning algorithms, and thus data building behavior is necessarily required.

According to the related art, there is a problem in that, because data is built by human hands, a large cost is incurred, and as the amount of built data increases, training data is asymmetrically generated only as duplicate data or in a document of a specific subject due to the limitation of memory such that the data is biased.

SUMMARY OF THE INVENTION

The present invention is directed to providing an apparatus and method for automatically generating and managing machine reading comprehension training data based on text semantic analysis.

According to an aspect of the present invention, there is provided an apparatus for automatically generating machine reading comprehension training data, which includes a domain selection text collection unit configured to collect pieces of text data according to domains and subjects, a paragraph selection unit configured to select a paragraph using the pieces of collected text data and determine whether questions and correct answers are generatable, and a question and correct answer generation unit configured to generate questions and correct answers from the selected paragraph.

The domain selection text collection unit may collect pieces of raw text data regarding a domain that requires additional training, the pieces of raw text data being determined using at least any one of a data distribution analysis result used for training deep learning and a user's query log analysis result.

The domain selection text collection unit may classify the pieces of collected text data according to the domains.

The paragraph selection unit may form the paragraph by structurally separating the paragraph from the pieces of collected text data according to characteristics of a document or forms the paragraph by dividing the pieces of collected text data into individual sentences and then combining the individual sentences.

The paragraph selection unit may determine whether the questions and the correct answers are generatable by checking length adequacy, informativity, and completeness.

The paragraph selection unit may check the informativity in consideration of types of parts of speech of vocabulary used in the paragraph.

The paragraph selection unit may check the informativity in consideration of a ratio of parts of speech of content words to parts of speech of function words.

The paragraph selection unit may check the completeness using a dependent syntax analysis result.

The paragraph selection unit may check the completeness in consideration of a degree of inclusion of main components including a subject, an object, and a verb.

The question and correct answer generation unit may generate the questions and the correct answers using semantic role recognition.

The question and correct answer generation unit may change a declarative sentence to an interrogative sentence by replacing specific semantic roles with blanks to generate the questions, and automatically generate the questions and the correct answers using the specific semantic roles replaced with the blanks as the correct answers.

The question and correct answer generation unit may automatically generate the questions and the correct answers using labels related to semantic role labels.

The apparatus for automatically generating machine reading comprehension training data may further include a data management unit configured to store and manage the generated questions and the correct answers, wherein the data management unit may provide a classification result by category for pieces of data used for learning a model in use to a question answering system.

According to another aspect of the present invention, there is provided a method of automatically generating machine reading comprehension training data which includes an operation (a) of selecting and collecting pieces of text data, an operation (b) of selecting a paragraph using the pieces of collected text data and selecting the paragraph by determining whether a sufficient amount of information is included and whether there is a misspelling or an incomplete sentence, and an operation (c) of automatically extracting a question-correct answer pair using the selected paragraph through semantic analysis.

The operation (b) may include selecting the paragraph by checking length adequacy, informativity, and completeness, wherein the informativity is checked in consideration of a ratio of parts of speech in the paragraph and the completeness is checked using a dependent syntax analysis result.

The operation (c) may include generating an interrogative sentence by replacing specific semantic roles with blanks with reference to labels related to semantic role labels, generating the specific semantic role as the correct answer, and automatically extracting the question and the correct answer.

According to still another aspect of the present invention, there is provided a system for automatically generating machine reading comprehension training data, which includes an input unit configured to collect pieces of text on the basis of a web, a memory in which a program for generating machine reading comprehension training data using the pieces of text is stored, and a processor configured to execute the program, wherein the processor determines whether questions and correct answers are generatable using the pieces of collected text and automatically generates the questions and the correct answers using a selected text.

The input unit may collect the pieces of text regarding a domain requiring additional training, the pieces of text being analyzed using at least any one of a data distribution analysis result used for training deep learning and a user's query log analysis result.

The processor may select a paragraph by structurally separating the paragraph from the text or selects the paragraph by dividing the text into individual sentences and then combining the individual sentences and determines whether the questions and the correct answers are generatable by checking informativity and completeness.

The processor may check the informativity in consideration of types of parts of speech of vocabulary used in the paragraph, check the completeness using a dependent syntax analysis result, and automatically generate the questions and the correct answers using semantic role recognition.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2A and FIG. 2B illustrate paragraph division based on structural features of a document according to an embodiment of the present invention;

DETAILED DESCRIPTION OF EXEMPLARY EMBODIMENTS

The above-described objects, other objects, advantages, and features of the present invention and methods of achieving the same will be clearly understood with reference to the accompanying drawings and the following detailed embodiments.

However, the present invention is not limited to the embodiments to be disclosed below and may be implemented in various different forms. The following embodiments are merely provided to easily inform those skilled in the art of the objects, configuration, and effects of the present invention. The scope of the present invention is defined by the appended claims.

Meanwhile, terms used herein are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations and/or elements but do not preclude the presence or addition of one or more other components, steps, operations and/or elements.

Hereinafter, in order to aid understanding of those skilled in the art, a background in which the present invention is proposed will be first described and embodiments of the present invention will be described.

Since the introduction of deep learning algorithms, artificial intelligence technology has been introduced in various fields and shows higher performance than the conventional machine learning (e.g., support-vector machines (SVMs), decision tree, etc.).

According to the related art, in order to train a deep learning model to achieve good performance, more amounts of training data than that of data used in the conventional machine learning is required, and in order to make the training data, a large number of users manually generate correct answer data.

According to the related art, methods of generating data for training through machine learning or deep learning algorithms have been proposed. However, most domains of training data are related to images, and since the training data is difficult to process with only superficial letters, there is a limitation that methods of generating data related to text have been rarely proposed.

According to the related art, the users build the training data in advance, select data having a high similarity to the training data from among new pieces of data, and add the selected data to the training data, and thus the training data related to the text is generated.

However, according to the related art, although it is possible to generate new training data by extracting the data having the high similarity, costs of directly generating reference data used by the users to measure the similarity are incurred.

In addition, there is a problem in that, since it is necessary to find data similar to the reference data, there is a high probability that data related to the domain of the pre-built data will be added, and thus the data is highly likely to be biased.

The present invention has been proposed to solve the above-described problems and proposes an apparatus and method for automatically generating new training data without a user manually building data.

According to the present invention, since it is possible to generate training data related to various domains without being dependent on a specific domain, the balance of the data is high, and thus a better effect may be obtained for training through an artificial intelligence model.

According to the related art, in relation to images, in a method of automatically generating training data, virtual training data is generated by adjusting a size or direction of the image on the assumption that there is training data that is pre-built in the same way as text.

Although a type of training data is different from that of the text, there is a difference in that, in the related art, existing data is processed and reused, whereas in the present invention, new data is automatically generated from a new type of text.

According to the present invention, it is possible to eliminate a cost of a user's direct intervention in automatically building the existing training data and to automatically generate the training data.

The present invention relates to a natural-language understanding technique, a text classification technique, a text generation technique, and a text segmentation technique.

The natural-language understanding technique is a technique that is the basis of the present invention and in which information of a sentence is analyzed in various ways from a lexical level to a sentence level of the text. Representative techniques thereof include a morpheme analysis technique, an entity name recognition technique, a dependency syntax analysis technique, a semantic role recognition technique, and the like.

The text classification technique is a technique for classifying text according to a specific category using machine learning or deep learning algorithms based on the content of natural-language understanding on the basis of category classification labels predefined by the user. In the present invention, the text classification technique is used for classifying subjects (domains) of the text.

Generally, the text generation technique is a technique for generating a new sentence while adding vocabulary with a high probability of being generated after a given specific lexicon or phrase on the basis of a pre-generated language model. In the present invention, the text generation technique is used for generating an interrogative sentence from a declarative sentence through inversion without generating a new sentence using a language model.

The text segmentation technique is a technique for segmenting a document into syntactic/semantic units in the document in order to divide a long document into semantic units. In the present invention, the text segmentation technique is used for dividing long text into units that may be processed by a machine.

Figure 1:
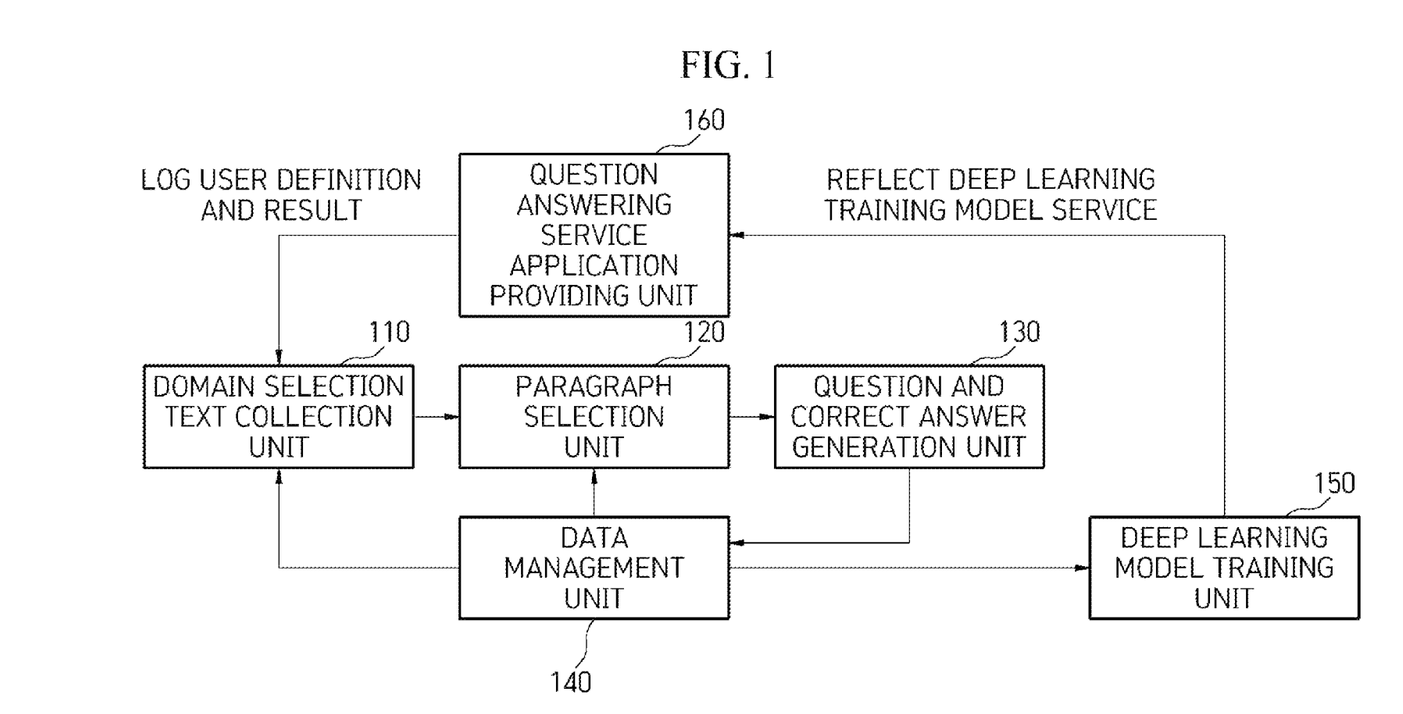
FIG. 1 illustrates an apparatus for automatically generating machine reading comprehension training data according to an embodiment of the present invention.

FIG. 1 illustrates an apparatus for automatically generating machine reading comprehension training data according to an embodiment of the present invention.

According to the embodiment of the present invention, a user does not directly build training data used in a deep learning algorithm and a device automatically generates, manages, and learns the training data.

According to the embodiment of the present invention, in a question answering system, question-correct answer-paragraph pairs, which are pieces of training data used to train a model for extracting correct answers, are automatically generated.

First, when describing a process of automatically generating machine reading comprehension training data according to the embodiment of the present invention, a domain distribution of data is grasped by analyzing the data used for learning the model in use in the question answering system, pieces of data with respect to insufficient domains are collected, or domains of frequently mentioned questions from among pieces of query data collected in real time from service users are analyzed.

Next, encyclopedia content, news articles, and social networking service (SNS) data are collected through the web and pieces of data corresponding to the insufficient domains are selected and collected.

From among the pieces of selected and collected data, whether there is information in the text is determined or whether a sentence is a normal sentence is determined in order to exclude a misspelling or an incomplete sentence.

When the pieces of collected data are normal sentences and have informativity, question-correct answer-paragraph pairs are automatically extracted using semantic analysis.

The automatically extracted question-correct answer-paragraph pairs are stored, and the pieces of stored data are used again for training the deep learning algorithm and finally reflected to a question answering service application.

While grasping a distribution of the pieces of stored data, a series of processes may be repeatedly performed again from the domain selection text collection operation.

The apparatus for automatically generating machine reading comprehension training data according to the embodiment of the present invention includes a domain selection text collection unit 110 which collects pieces of text according to domains and subjects, a paragraph selection unit 120 which determines whether questions and correct answers are generatable using the pieces of collected text and which selects a paragraph which is a processing unit in a document, a question and correct answer generation unit 130 which generates questions and correct answers from the selected paragraph, and a data management unit 140 which stores and manages the generated questions and the correct answers.

The domain selection text collection unit 110 analyzes a distribution of pieces of data used for training deep learning or analyzes a user's query log collected in a service to determine a domain requiring additional training, and collects pieces of raw text data with respect to insufficient domains.

The domain selection text collection unit 110 collects sources of the pieces of text from the web, and encyclopedias, news, SNS, and the like are used as the sources.

Since the question answering system according to the embodiment of the present invention has no domain limitation, various pieces of source data are collected and used.

The domain selection text collection unit 110 classifies the pieces of collected data in order to use the domains of the pieces of collected data according to the purpose.

The classification process is performed according to predefined domain categories using a machine learning algorithm or a deep learning algorithm.

For example, algorithms such as support vector machine and decision tree are used as a machine learning algorithm, and algorithms such as a random neural network (RNN), a deep neural network (DNN), and Bidirectional Encoder Representations from Transformers (BERT) are used as a method of training the deep learning.

Document subject classification categories are set according to the purpose of the user, like sports, entertainment, people, history, plants, etc. according to the subject of the document.

Since the pieces of data collected by the domain selection text collection unit 110 are pieces of text classified only by the subject according to the domain, the paragraph selection unit 120 checks length adequacy of the text, informativity, and completeness of the sentence in order to determine whether the pieces of collected data are usable as question and answer training data.

This is because, from among pieces of SNS data, it is difficult to use a sentence such as an abbreviation, profanity, or the like, which is not a normal sentence, as the training data and there may be insufficient information required for questions and answers.

Further, this is because, even when information is included, long text contains various pieces of information and various subjects and the pieces of information and the subjects may act as noise when a computer is trained.

Figure 2A:
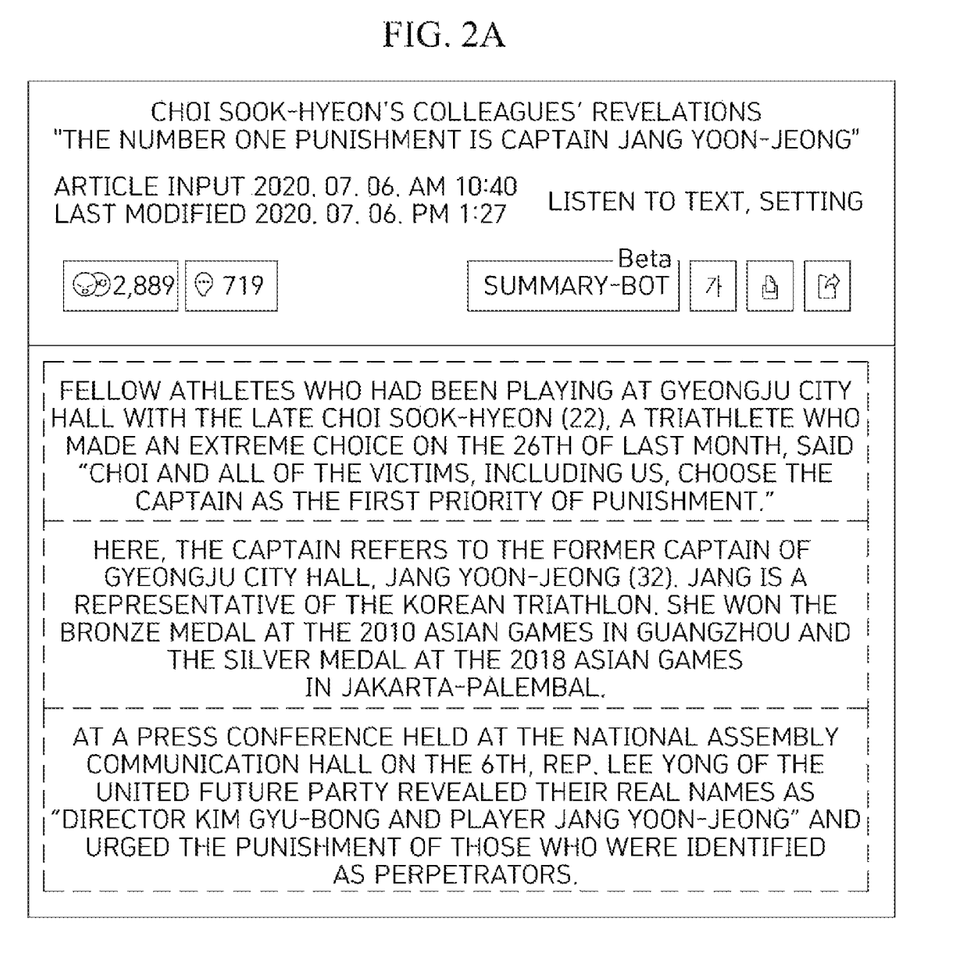

As illustrated in FIG. 2A and FIG. 2B, the paragraph selection unit 120 structurally divides the paragraph into sentences in the pieces of collected text according to characteristics of the document or divides the pieces of text into individual sentences using a sentence separator and then combines one or more sentences to form one paragraph.

The paragraph selection unit 120 uses types of vocabulary used in the paragraph and a syntax analysis result in determining informativity and completeness of the document.

As a criterion for determining whether there is informativity, types of parts of speech of the vocabulary used in the paragraph are considered.

That is, a ratio of parts of speech (noun, verb, adjective, adverb, and determiner) of content words to parts of speech (postposition and suffix) of function words from among the vocabulary in the paragraph is considered, wherein when the ratio of the parts of speech of the content words to the parts of speech of the function words is high, it is determined that there is informativity and when the ratio of the parts of speech of the function words to the parts of speech of the content words is high, it is determined that the informativity is low.

Further, in order to determine whether the document is complete (whether the text is a complete sentence), a result of a dependent syntax analysis technique is used.

The dependent syntax analysis technique is a technique for analyzing components of a sentence, and in the dependent syntax analysis technique, components such as a subject, an object, and a verb are analyzed.

Figure 3:
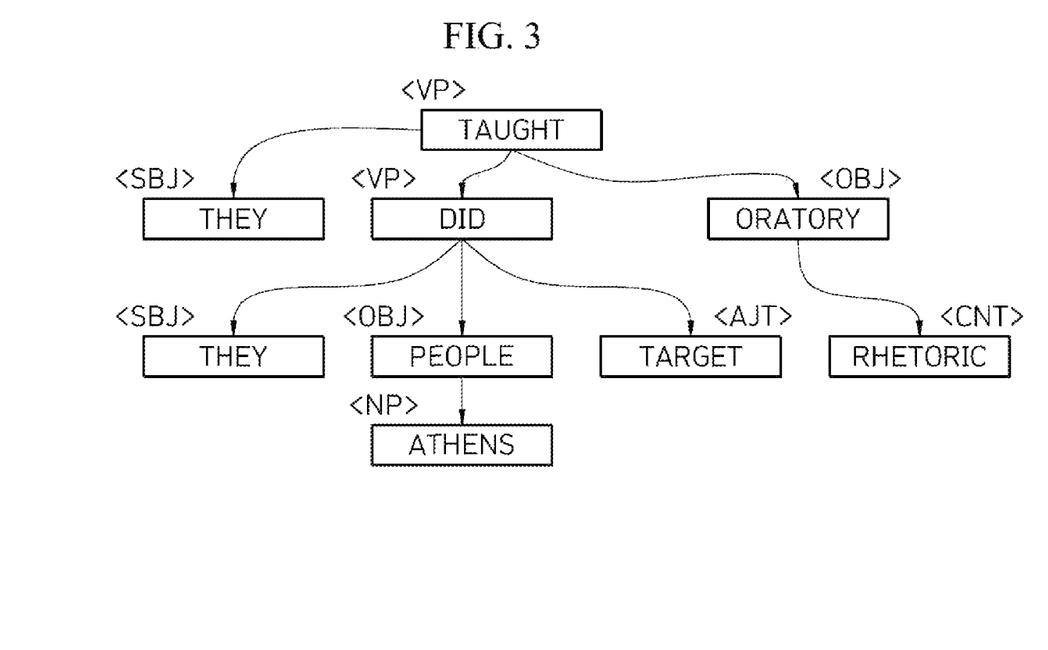
FIG. 3 illustrates an example for describing a classification and analysis result according to an embodiment of the present invention.

FIG. 3 illustrates an example for describing a classification and analysis result according to an embodiment of the present invention and illustrates, for example, an analysis result for a sentence, "They targeted the Athenians and taught rhetoric and oratory."

As illustrated in FIG. 3, when main components such as a subject (SBJ), an object (OBJ), a verb (VP), and the like are included in the sentence, it is determined that the sentence is a complete sentence, otherwise it is determined that the sentence is an incomplete sentence.

The paragraphs selected through the paragraph selection unit 120 are sufficiently used as pieces of training data and are transmitted to the question and correct answer generation unit 130.

The question and correct answer generation unit 130 extracts questions and correct answers from the selected paragraphs received from the paragraph selection unit 120.

The question and correct answer generation unit 130 uses semantic role labeling (SRL) (semantic role recognition) to extract the questions and the correct answers.

The SRL is a technique for analyzing a semantic relationship in a sentence between components necessary to complete the sentence in natural-language text.

Figure 4:
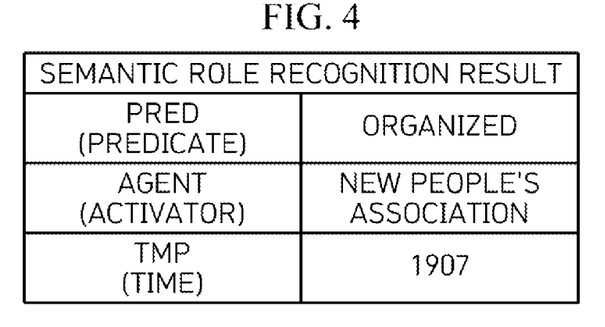
FIG. 4 illustrates an example for describing a semantic role labeling (SRL) analysis result according to an embodiment of the present invention.
Figure 5:
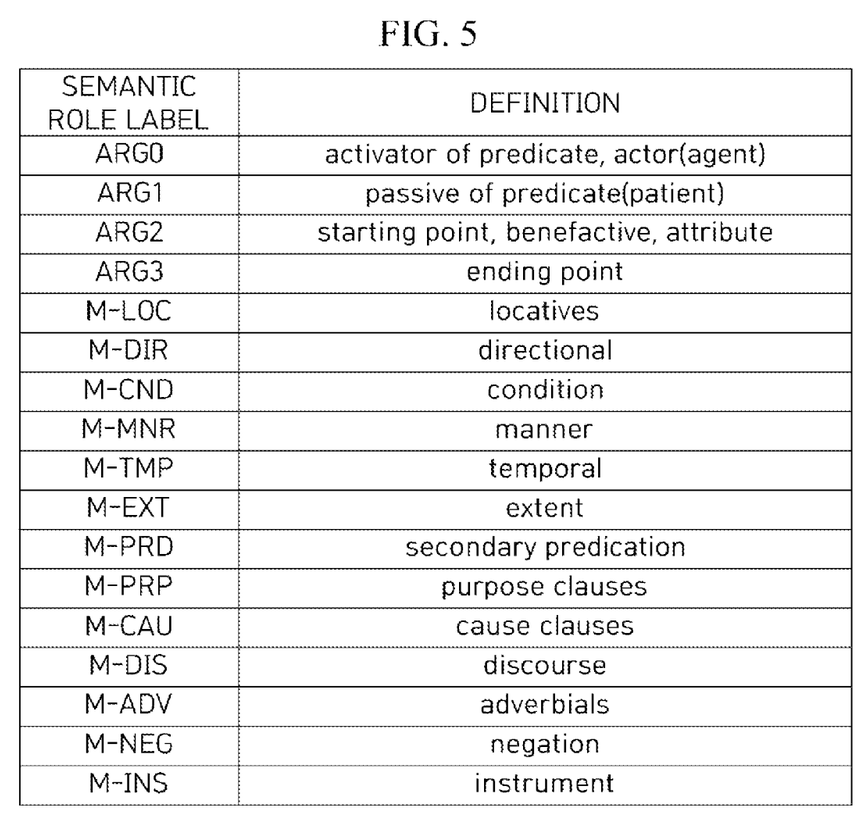
FIG. 5 illustrates label information used for SRL analysis according to an embodiment of the present invention.

For example, when it is assumed that there are a sentence #1, "The New People's Association was organized in 1907" and a sentence #2, "The New People's Association organized in 1907 . . . ," even when a structure of the sentence is changed, the sentence may be analyzed as illustrated in FIG. 4 in terms of a semantic point of view, and labels used for SRL analysis are set as illustrated in FIG. 5.

Since the question and correct answer generation unit 130 according to the embodiment of the present invention may analyze a semantic relationship between word segments, as the example illustrated in FIG. 4, the question and correct answer generation unit 130 analyzes a sentence having essential elements, changes the sentence to an interrogative sentence by replacing specific semantic roles with blanks to generate a question, and automatically generates question-correct answer pairs using the semantic role portions replaced with the blanks as the correct answers.

The question and correct answer generation unit 130 generates a question corresponding to "WHO," which is a question asking a performer and generates a question related to "WHEN" using a "M-TMP" label, a question related to "WHERE" using a "M-LOC" label, a "WHY" type question using a "M-CAU" label, a "HOW" type question using a "M-MNR" label, and a "WHAT" type question using other labels, according to types of various semantic role labels.

Figure 6:
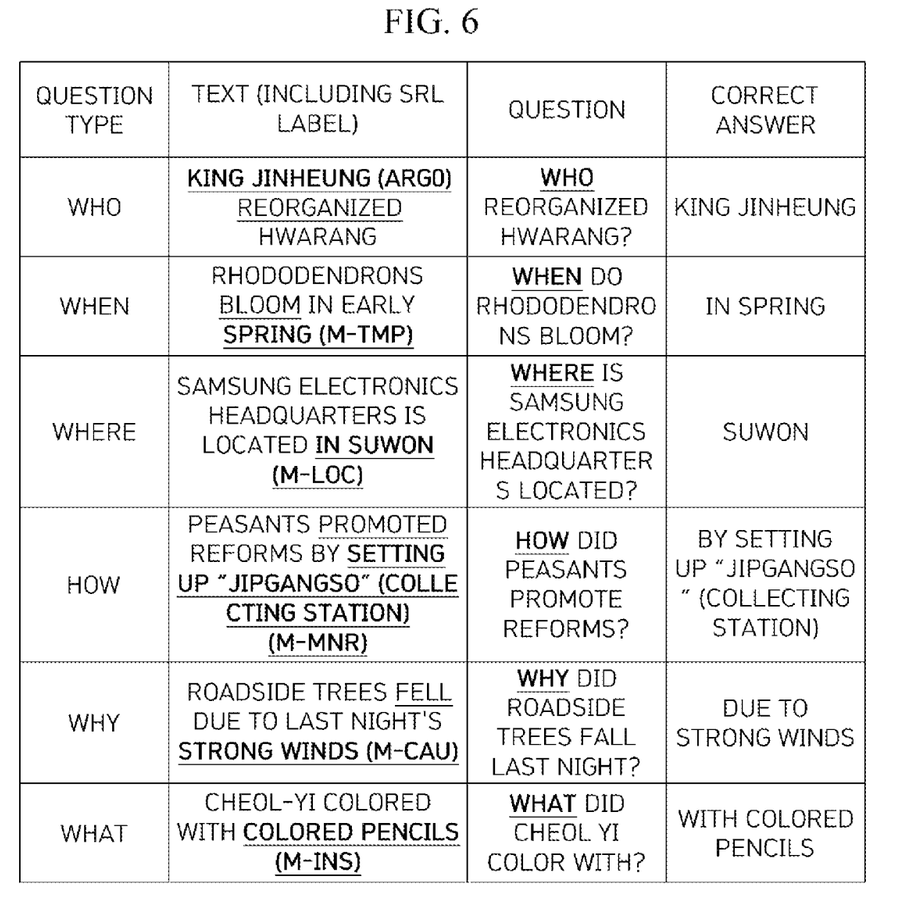
FIG. 6 illustrates an example of generating questions and/or correct answers based on SRL analysis according to an embodiment of the present invention.

FIG. 6 illustrates an example of generating a question/correct answer based on SRL analysis according to an embodiment of the present invention.

The question and correct answer generation unit 130 automatically generates a question-correct answer pair from text (paragraph) by inserting interrogatives at positions of who, when, where, how, why, and what in regenerating the sentence for question generation.

The text (paragraph), the questions, and the correct answers which are automatically extracted through the above-described process are transmitted to the data management unit 140.

The data management unit 140 stores and manages the text (paragraph), the question, and the correct answer which are automatically extracted from the paragraph and thus allows functions, such as insufficient domain analysis, query log domains of service users, re-training, and the like, and additional training to be performed.

Figure 7:
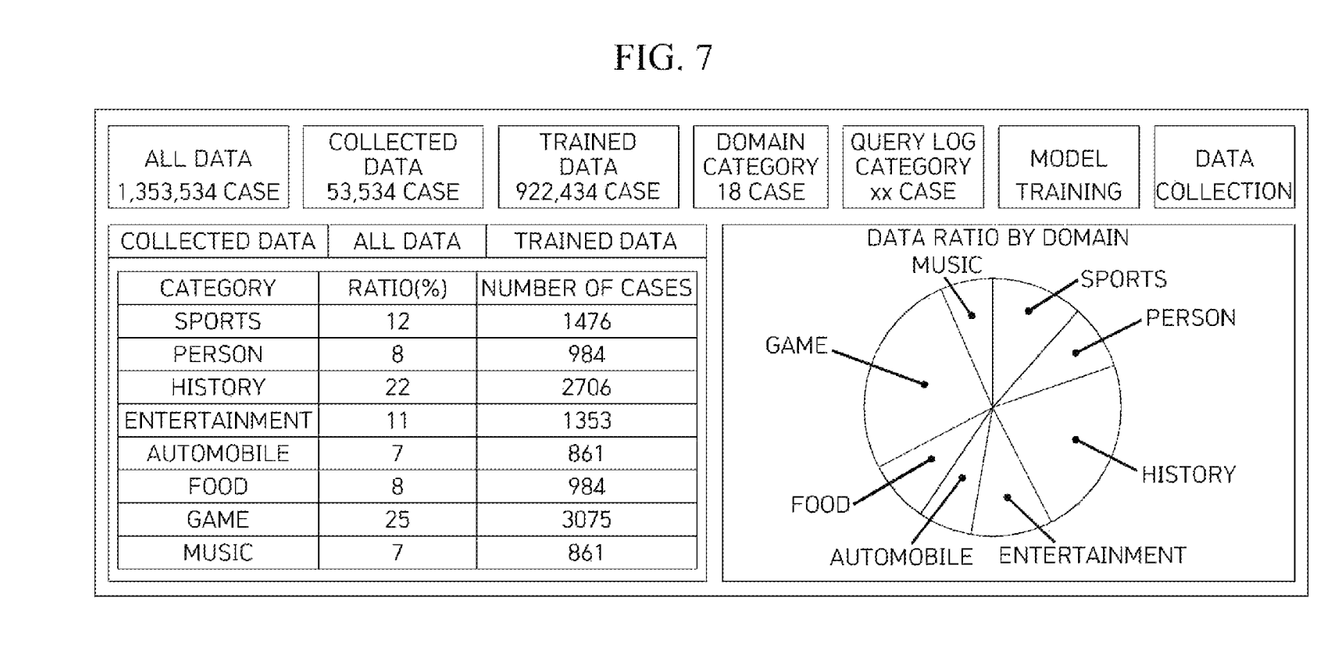
FIG. 7 illustrates an interface of a data management unit according to an embodiment of the present invention.

FIG. 7 illustrates an interface of a data management unit according to an embodiment of the present invention.

The data management unit 140 may infer question and answer capability of the system through category-specific classification of the data used for learning the model in use in the question answering system.

The data management unit 140 supports additionally collecting and managing an insufficient amount of data and performing model retraining in relation to the training data that directly affects performance of the question answering system.

According to the embodiment of the present invention, since the pieces of data are collected in simple consideration of an amount of data, it is possible to maintain a ratio of data according to categorized domains and it is possible to obtain high performance.

From among the pieces of data collected in real time from the service users of the question answering system, by additionally selecting and collecting pieces of data of popular domains, the model retraining is performed and quality of the service is maintained.

Figure 8:
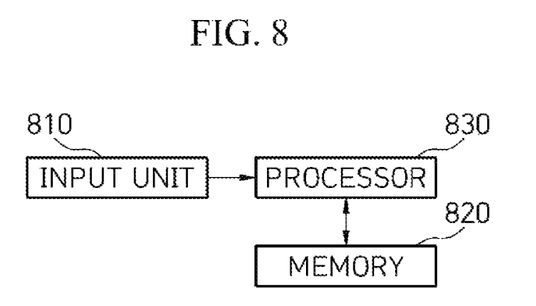
FIG. 8 illustrates a system for automatically generating machine reading comprehension training data according to an embodiment of the present invention.

FIG. 8 illustrates a system for automatically generating machine reading comprehension training data according to an embodiment of the present invention.

The system for automatically generating machine reading comprehension training data according to the embodiment of the present invention includes an input unit 810 that collects pieces of text on the basis of a web, a memory 820 in which a program for generating machine reading comprehension training data using the pieces of text is stored, and a processor 830 that executes the program. The processor 830 determines whether questions and correct answers are generatable using the pieces of collected text and automatically generates the questions and the correct answers using a selected text.

The input unit 810 collects the pieces of text regarding a domain requiring additional training, wherein the pieces of text is analyzed using at least any one of a data distribution analysis result used for training deep learning and a user's query log analysis result.

The processor 830 selects a paragraph by structurally separating the paragraph from the pieces of collected text or selects the paragraph by dividing the pieces of collected text into individual sentences and then combining the individual sentences and determines whether the questions and the correct answers are generatable by checking informativity and completeness of the paragraph.

The processor 830 checks the informativity in consideration of types of parts of speech of vocabulary used in the paragraph, checks the completeness using a dependent syntax analysis result, and automatically generates the questions and the correct answers using semantic role recognition.

A method of automatically generating machine reading comprehension training data according to the embodiment of the present invention includes an operation (a) of selecting and collecting pieces of text data, an operation (b) of selecting a paragraph using the pieces of collected text data and selecting the paragraph by determining whether a sufficient amount of information is included and whether there is a misspelling or an incomplete sentence, and an operation (c) of automatically extracting a question-correct answer pair using the selected paragraph through semantic analysis.

The operation (b) includes selecting the paragraph by checking length adequacy, informativity, and completeness, wherein the informativity is checked in consideration of a ratio of parts of speech in the paragraph and the completeness is checked using a dependent syntax analysis result.

The operation (c) includes generating an interrogative sentence by changing specific semantic roles with blanks with reference to labels related to semantic role labels, generating the specific semantic role as the correct answer, and automatically extracting the question and the correct answer.

Figure 9:
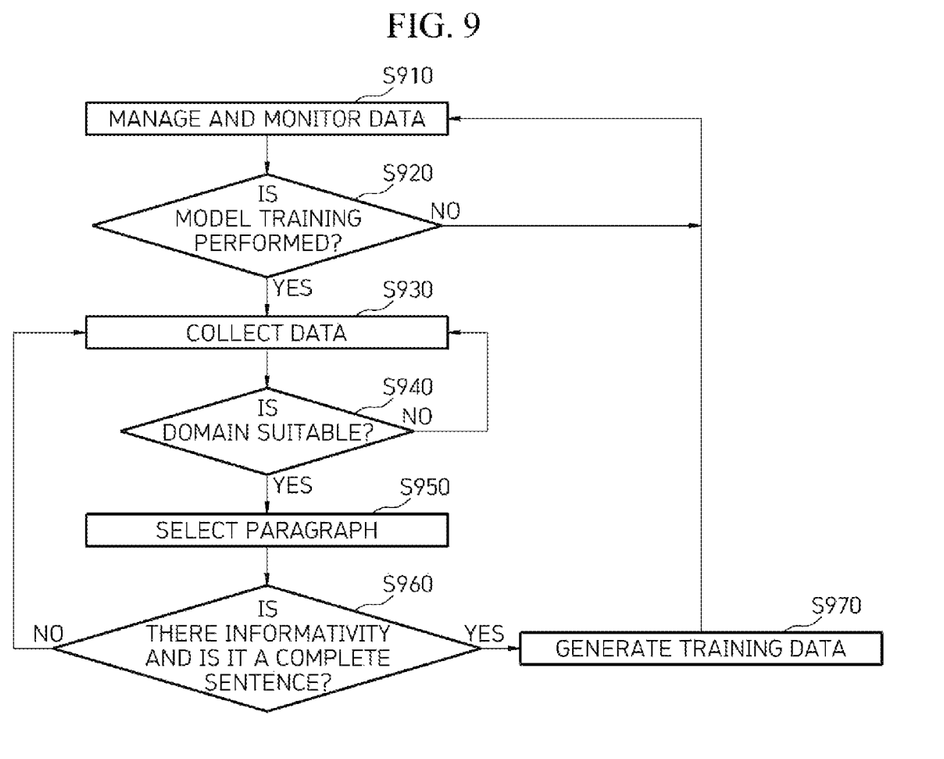
FIG. 9 illustrates a method of automatically generating machine reading comprehension training data according to an embodiment of the present invention.

FIG. 9 illustrates a method of automatically generating machine reading comprehension training data according to an embodiment of the present invention.

When data management and monitoring are performed (S910) and model training to be used in a question answering system is performed (S920), pieces of data are collected to analyze data used for learning the model (S930).

In operation S930, a distribution of the pieces of data used for training deep learning is analyzed or the user's query logs collected in the service are analyzed so that a domain that requires additional training is determined, and pieces of raw text data with respect to insufficient domains are collected.

In operation S940, in order to use the domains of the pieces of collected data according to the purpose, the domains are classified and whether the domains have suitability is determined.

In operation S950, the paragraph is structurally divided into sentences in the pieces of collected text according to characteristics of the document, or the pieces of text are divided into individual sentences, and then one or more sentences are combined to form a paragraph.

In operation S960, whether the text classified by subjects according to the domains is usable as question and answer training data is determined, and length adequacy of the text, informativity, and completeness of the sentence are checked.

In operation S960, the informativity is checked in consideration of types of parts of speech of vocabulary used in the paragraph, and the completeness is checked using a dependent syntax analysis result.

In operation S970, questions and correct answers are extracted from the selected paragraph, and in this case, the questions and the correct answers are extracted using SRL.

In operation S970, questions are generated according to types of semantic role labels, and the questions and the correct answers are automatically generated using semantic role portions replaced with blanks as the correct answers.

Meanwhile, the method of automatically generating machine reading comprehension training data according to the embodiment of the present invention is implemented in a computer system or recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device that processes instructions stored in the memory and/or the storage.

The memory and the storage may include various types of volatile or nonvolatile storage media. For example, the memory may include a read only memory (ROM) and a random access memory (RAM).

Therefore, the method of automatically generating machine reading comprehension training data according to the embodiment of the present invention may be implemented as a computer-executable method. When the method of automatically generating machine reading comprehension training data according to the embodiment of the present invention is performed in a computer device, computer-readable instructions may perform the method of automatically generating machine reading comprehension training data.

Meanwhile, the method of automatically generating machine reading comprehension training data according to the embodiment of the present invention described above may be implemented as computer readable code in a computer-readable recording medium. The computer-readable recording medium includes any type of recording medium in which data that can be decoded by a computer system is stored. For example, a ROM, a RAM, a magnetic tape, a magnetic disk, a flash memory, an optical data storage device, and the like may be exemplified. In addition, computer-readable recording media may be distributed in computer systems connected through a computer communication network and stored and executed as code that can be read in a distributed manner.

According to the present invention, in an environment in which deep learning algorithms are actively used and a demand for training data is high, costs (resource deployment costs) used to build data can be reduced.

A framework that is usable not only for text-based question answering systems but also for machine learning-applied systems can be provided.

According to the related art, domains expand by generating training data for each domain in order to generate a question-and-answer model for each task (e.g., a legal question-and-answer, a general field question-and-answer, and a patent question-and-answer). However, according to the present invention, domains can easily expand to various domains as well as a specific domain.

Effects of the present invention are not limited to the above-described effects and other effects which have not been described may be clearly understood by those skilled in the art from the above detailed descriptions.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium.

The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for automatically generating machine reading comprehension training data, the apparatus comprising:

a processor;

a domain selection text collector configured via the processor to collect pieces of text data according to domains and subjects;

a paragraph selector configured via the processor to select a paragraph using the pieces of collected text data and determine whether questions and correct answers are generatable; and a question and correct answer generator configured via the processor to generate questions and correct answers from the selected paragraph, wherein the paragraph selector determines whether the questions and the correct answers are generatable by checking informativity and completeness, wherein the paragraph selector checks the informativity in consideration of types of parts of speech of vocabulary used in the paragraph, and a ratio of parts of speech of content words including noun, verb, adjective, adverb, and determiner, to parts of speech of function words including postposition and suffix, and wherein the paragraph selector determines that there is informativity when the ratio of the parts of speech of the content words to the parts of speech of the function words is high, and determines that the informativity is low when the ratio of the parts of speech of the function words to the parts of speech of the content words is high.

2. The apparatus of claim 1, wherein the domain selection text collector collects pieces of raw text data regarding a domain that requires additional training, the pieces of raw text data being determined using at least any one of a data distribution analysis result used for training deep learning and a user's query log analysis result.

3. The apparatus of claim 1, wherein the domain selection text collector classifies the pieces of collected text data according to the domains.

4. The apparatus of claim 1, wherein the paragraph selector forms the paragraph by structurally separating the paragraph from the pieces of collected text data according to characteristics of a document or forms the paragraph by dividing the pieces of collected text data into individual sentences and then combining the individual sentences.

5. The apparatus of claim 1, wherein the paragraph selector checks the completeness using a dependent syntax analysis result.

6. The apparatus of claim 5, wherein the paragraph selector checks the completeness in consideration of a degree of inclusion of main components including a subject, an object, and a verb.

7. The apparatus of claim 1, wherein the question and correct answer generator generates the questions and the correct answers using semantic role recognition.

8. The apparatus of claim 7, wherein the question and correct answer generator changes a declarative sentence to an interrogative sentence by replacing specific semantic roles with blanks to generate the questions and automatically generates the questions and the correct answers using the specific semantic roles replaced with the blanks as the correct answers.

9. The apparatus of claim 8, wherein the question and correct answer generator automatically generates the questions and the correct answers using labels related to semantic role labels.

10. The apparatus of claim 1, further comprising a data manager configured via the processor to store and manage the generated questions and the correct answers,
wherein the data manager provides a classification result by category for pieces of data used for learning a model in use to a question answering system.

11. A method of automatically generating machine reading comprehension training data, the method comprising:
an operation (a) of selecting and collecting pieces of text data;
an operation (b) of selecting a paragraph using the pieces of collected text data and selecting the paragraph by determining whether a sufficient amount of information is included and whether there is a misspelling or an incomplete sentence; and
an operation (c) of automatically extracting a question-correct answer pair using the selected paragraph through semantic analysis,
wherein the operation (b) includes selecting the paragraph by checking length adequacy, informativity, and completeness,
wherein the informativity is checked in consideration of a ratio of parts of speech in the paragraph and the completeness is checked using a dependent syntax analysis result,
wherein the operation (b) includes checking the informativity in consideration of types of parts of speech of vocabulary used in the paragraph, and a ratio of parts of speech of content words including noun, verb, adjective, adverb, and determiner, to parts of speech of function words including postposition and suffix, and
wherein the operation (b) includes determining that there is informativity when the ratio of the parts of speech of the content words to the parts of speech of the function words is high, and determining that the informativity is low when the ratio of the parts of speech of the function words to the parts of speech of the content words is high.

12. The method of claim 11, wherein the operation (c) includes generating an interrogative sentence by replacing specific semantic roles with blanks with reference to labels related to semantic role labels, generating the specific semantic role as the correct answer, and automatically extracting the question and the correct answer.

13. A system for automatically generating machine reading comprehension training data, the system comprising:
an input configured to collect pieces of text on the basis of a web;
a memory in which a program for generating machine reading comprehension training data using the pieces of text is stored; and
a processor configured to execute the program,
wherein the processor determines whether questions and correct answers are generatable using the pieces of collected text and automatically generates the questions and the correct answers using a selected text,
wherein the processor selects a paragraph by structurally separating the paragraph from the text or selects the paragraph by dividing the text into individual sentences and then combining the individual sentences and determines whether the questions and the correct answers are generatable by checking informativity and completeness of the paragraph,
wherein the processor checks the informativity in consideration of types of parts of speech of vocabulary used in the paragraph, checks the completeness using a dependent syntax analysis result, and automatically generates the questions and the correct answers using semantic role recognition,
wherein a paragraph selector checks, via the processor, the informativity in consideration of types of parts of speech of vocabulary used in the paragraph, and a ratio of parts of speech of content words including noun, verb, adjective, adverb, and determiner, to parts of speech of function words including postposition and suffix, and
wherein the paragraph selector determines, via the processor, that there is informativity when the ratio of the parts of speech of the content words to the parts of speech of the function words is high, and determines, via the processor, that the informativity is low when the ratio of the parts of speech of the function words to the parts of speech of the content words is high.

14. The system of claim 13, wherein the input is configured to collect the pieces of text regarding a domain requiring additional training, the pieces of text being analyzed using at least any one of a data distribution analysis result used for training deep learning and a user's query log analysis result.

* * * * *